United States Patent
Terho et al.

[11] Patent Number: 6,067,534
[45] Date of Patent: May 23, 2000

[54] METHOD AND EQUIPMENT FOR THE CONTROL OF A DATA TRANSFER CONNECTION

[75] Inventors: Mikko Terho; Petri Nykanen, both of Tampere, Finland

[73] Assignee: Nokia Mobile Phones Ltd., Finland

[21] Appl. No.: 08/564,066

[22] Filed: Dec. 2, 1997

[51] Int. Cl.[7] .................................................. G06N 3/02
[52] U.S. Cl. ........................................ 706/2; 706/3; 706/6
[58] Field of Search ............................................ 706/2, 3, 6

[56] References Cited

U.S. PATENT DOCUMENTS

5,384,697  1/1995  Pascucci ................................... 364/139
5,463,735  10/1995 Pascucci et al. ........................ 709/222
5,555,444  9/1996  Diekelman et al. .................... 455/12.1

*Primary Examiner*—Kevin J. Teska
*Assistant Examiner*—Wilbert L. Starks, Jr.
*Attorney, Agent, or Firm*—Perman & Green, LLP

[57] ABSTRACT

In data transfer connections with disturbances, e.g. in cellular networks, it is possible to establish and maintain an optimal connection using the solution according to the present invention. The optimal parameters for each data transfer connection are saved in the modem database. When the user next calls a number, the data of which has been saved, the parameters saved in the database are first used for the connection control. Interference occurring during the data transfer is handled with the help of the database with adaptive logic searching for the optimal data transfer rate and other connection parameters.

29 Claims, 3 Drawing Sheets

METHOD AND EQUIPMENT FOR THE CONTROL OF A DATA TRANSFER CONNECTION

BACKGROUND OF THE INVENTION

1. Field of the Invention

The present invention relates to a method and equipment for establishing a reliable data link also in a data transfer environment with strong interference.

2. Description of the Prior Art

In telephone networks of poor quality, and especially in cellular networks, data transfer connections must endure various disturbances caused by the network. These disturbances vary from connection to connection and may also vary during a connection, especially when one of the participants in the connection is a mobile station moving from one place to another.

This kind of functional environment makes great demands on the interference tolerance of the modem. In some cases, the present modems make data links rather unreliable and slow, thus forming a great obstacle on the development of personal communicators, especially in mobile use.

Connection establishment in fixed networks is simpler than in cellular networks because the fixed network environment is fairly constant. Due to this systems primarily designed for fixed networks are unable to remedy/mend problems inherent to cellular networks.

Data transfer in cellular networks is a fairly new technological concept, and modems designed for cellular use have been on market for only a short period of time. While developing cellular modems, the usual approach has been to fulfil the functional requirements and, accordingly, new problems brought on by the radio line used in data transfer have been ignored to some degree. It has been erroneously assumed that merely the usage of an error correcting protocol (such as CCITT V.42) is sufficient to guarantee a reliable data link. Thus manufacturers have used for cellular modems principally the same programs and methods as for modems in fixed networks, for example for the changing of data transfer rate and for other corresponding tasks.

The conventional PID (Proportional Integral Derivative) control systems of the known technology hare fixed limits to the values of each input parameter which do not take in account the interactions caused by the disturbances of the cellular network. Further, these PID control systems cannot adapt to the changing environmental circumstances, but the system must be adjusted to correspond with the changed circumstances, for example by modifying the modem software in accordance with the usage in question. It is not possible for the user to tune the modem for different operating environments. Further, the radio connection may suffer from strong burst interference which may lead to a premature disconnection, although it could have been possible to maintain the connection by repeating the handshake/synchronization after the error burst.

When establishing a connection, the known modems are unable to use statistical information, such as telephone numbers, estimated length of the connection, or selection of previous connections. So far it has been desirable to maintain the rate control with the current data transfer connection as simple as possible, because the modem processor control has already been used nearly to its full capacity. Usage of more efficient processors also enables the usage of more efficient adaptive algorithms for environmental modifications without degrading the basic modem operation.

Some modems offer the user limited possibilities to control the connection establishment for example in such a way that he can choose the desired transfer rate and activate certain handshaking methods, when it is assumed that the user makes the needed modifications in the registers. However, for most users this task is too complicated. Other modems offer no such possibilities.

OBJECT OF THE INVENTION

It is the object of the present invention to achieve a method for controlling a modem connection in a transfer line with interference, thus making the establishment and maintenance of the connection faster and more reliable than earlier.

In order to achieve this, the characteristics of the method of the present invention are presented in the characterizing part of the claim 1, and the characteristics of the equipment of the invention are presented in the characterizing part of the claim 24. Advantageous embodiments of the invention are presented in dependent claims.

SUMMARY OF THE INVENTION

In accordance with a solution of the present invention, a control program is used in the connection establishment to retrieve historical connection parameter information related with the selected connection address; this parameter information is used to select, with the help of a preset algorithm, the parameters which will establish an optimal data transfer connection to the selected address; whilst the transfer connection is maintained, a modification program controls the preset quality parameters of the connection, on the basis of which, when necessary, the selected connection parameters are modified for maintaining or disconnecting the optimal data transfer connection according to another preset algorithm and with the help of history parameter information saved in the database; upon termination of the data transfer, parameters which as a whole produced an optimal data transfer result during the connection and which are linked to the connection address, are stored to the said database using the control program. Thus cumulating parameter information for obtaining the optimal data transfer result is linked to the connection address of the telephone number in the modem database. When the history information is used as parameters of the next data transfer connection to the same number, it is more probable to achieve a good connection.

The method of the present invention is for example applicable to a modem which comprises: a modem operations control block, a connection establishment block, and a possible data pump block, when the said blocks are linked to each other and to an external application software block via data transfer buses, the connection establishment block comprising a connection control block with a control program; a parameter block with a modification program and with a relating starting block, in which a direct start algorithm is functional; and a database block which includes the said database when blocks internal with the connection establishment block are linked to each other via data transfer buses. The method is also applicable to a digital data transfer connection, such as GSM/RLP, when the data pump block and modulation/demodulation operations are unnecessary.

When the modem is connected to a mobile station, the connection establishment block is also connected to the radio unit of the mobile station via a data transfer bus. Connection protocols V.32bis and/or V.42, or similar connection establishment or error correcting rules for multi-rate modems are applicable to the equipment.

For example, an algorithm based on fuzzy logic is used in the equipment parameter block. Alternatively, the algorithm may be based on neural networks or on a dynamic adaptive method for changing the parameter variables.

The method and equipment of the invention may be used for example in mobile stations in cellular networks, especially in mobile phones. The method can also be used in public telephone networks in connections with interference.

BRIEF DESCRIPTION OF THE DRAWINGS

In the following, the invention is described in more detail by way of examples and with reference to enclosed drawings, where.

DETAILED DESCRIPTION OF THE PREFERRED EMBODIMENTS(S)

Figure 1:
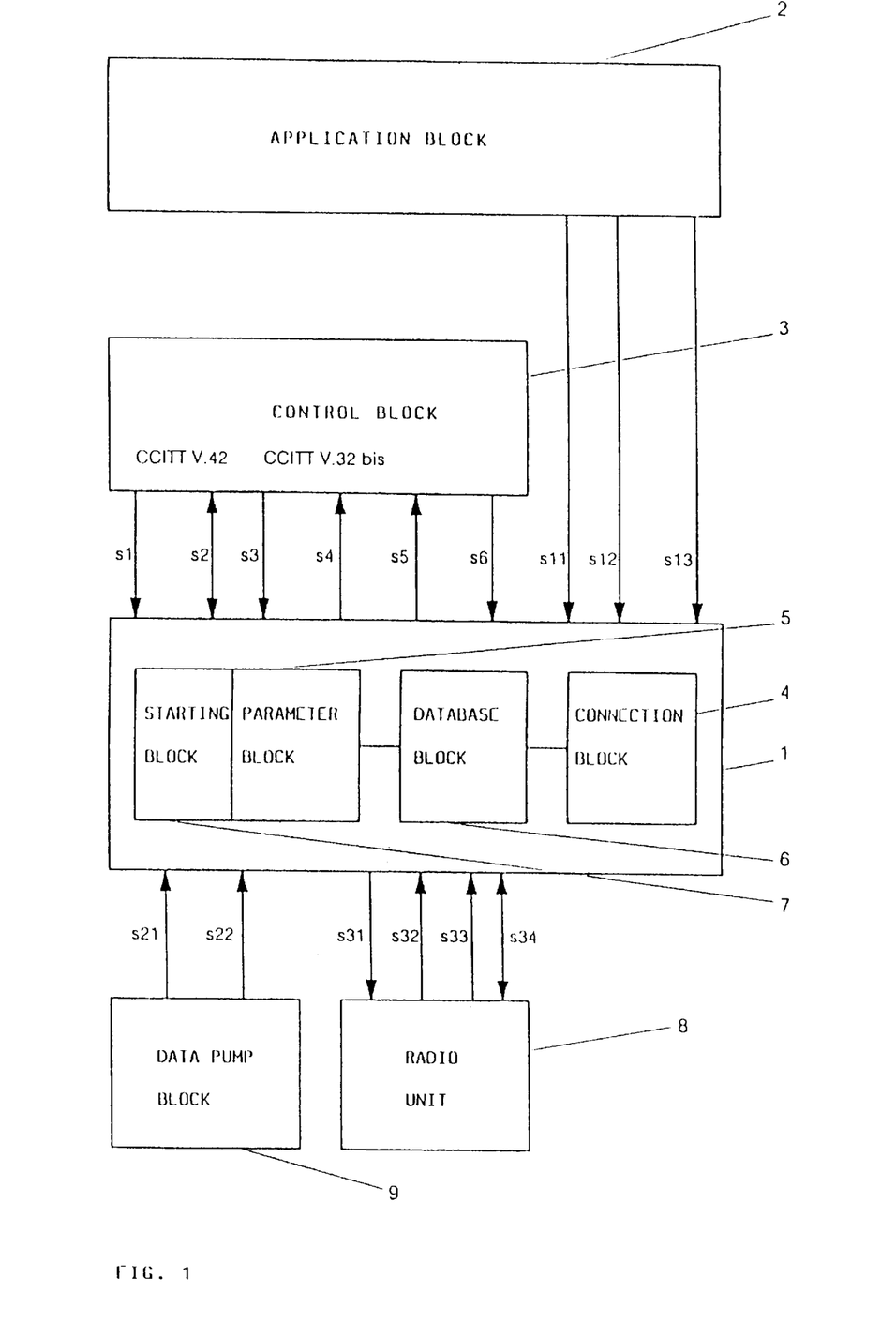
FIG. 1 is a block diagram of a connect-on establishment according to the present invention.

The invention will be described using a mobile phone as an example, the method of the invention being applied to a modem linked to the phone. In FIG. 1 is shown a block diagram of the operation of a connection established by a modem in accordance with the invention. The modem comprises a control block 3 of conventional modem operations, a connection establishment block 1, and a data pump block 9. These blocks 1, 3, 9 are linked to each other and to an external application software block 2 via data transfer buses s1–s6, s21–s22, s11–s13. Further, the connection establishment block comprises: a connection control blocs 4, where a control program is functional; a parameter block 5, where a modification program is functional and with a connecting starting block, where a direct start algorithm is functional; and a database block 6 including the database, the internal blocks of the connection establishment block 1 being linked to each other via data transfer buses. Modem operations V.32bis and V.42 are applicable in the modem operations control block (3), enabling in a known way data transfer on various rates up to 14,400 b/s, and error correction. Additionally, the modem is connected to the radio unit 9 of the mobile station. Different blocks have been linked to each other via data transfer buses. The software block 2 in FIG. 1 can be realized either in a mobile phone microprocessor or as a software operating in an external data processing device, for example in a so called laptop computer. Application block 2 is connected to the modem via a suitable terminal equipment line.

In the following, the assembly of a data transfer connection is examined. Let us assume that one wishes to send a file from a laptop computer (not shown) to a connection address, i.e. a telephone number. This connection address can be a public telephone network subscriber or a mobile terminal over a mobile phone/cellular network. Application software, i.e. the block 2 in FIG. 1 sends as output data the telephone number s11 and size s12 of the file (files) to be transmitted and/or the estimated connection time s13 on a line to the connection establishment block 1. Likewise, the connection establishment block 1 receives from the control block 3 as output data the system parameters s1 and other status and error data s6. From the data pump block 9, the connection establishment block 1 receives information on the current parameters s21 and on the signal s22 to be received; correspondingly, from the radio unit 8 it receives information on the data of the received signal s32 and the power status s33 supplied by the base station.

At connection control phase, the control program of the connection establishment block 4 (OCEC, optimal connection establishment control) is used to search for historical connection parameter information associated with the selected connection address from the database, and, on the basis of this parameter information, defined algorithm is used to select the parameters with which an optimal data transfer connection may be established.

It is a task of the connection control block 4 to establish such a data link which has the best possibilities to succeed on the basis of statistical information from database block 6 and of the telephone number used as address. An additional task is to change variables related with the telephone number in the database in such a way that the next connection can be established fast in an optimal way, by using the basic information supplied by the application software.

For example the following historical connection parameter information can be stored to the database block 6: the cumulative number of connections to the chosen connection address; the cumulative number of connections to other addresses; the connection protocol and the achieved data transfer rate used last to the chosen connection address; the best data transfer rate achieved by the available connection protocols; the data transfer rate and connection protocol which have been used most of the cumulative connection time; the statistical information on how much every data transfer rate in a protocol has been used of the cumulative connection time. It is seen that the database 6 includes common data both for the connection control block 4 and the parameter block 3.

Two different approaches can be used in the application of the connection control block, i.e. operation controlled by the application software and transparent operation.

Figure 3:
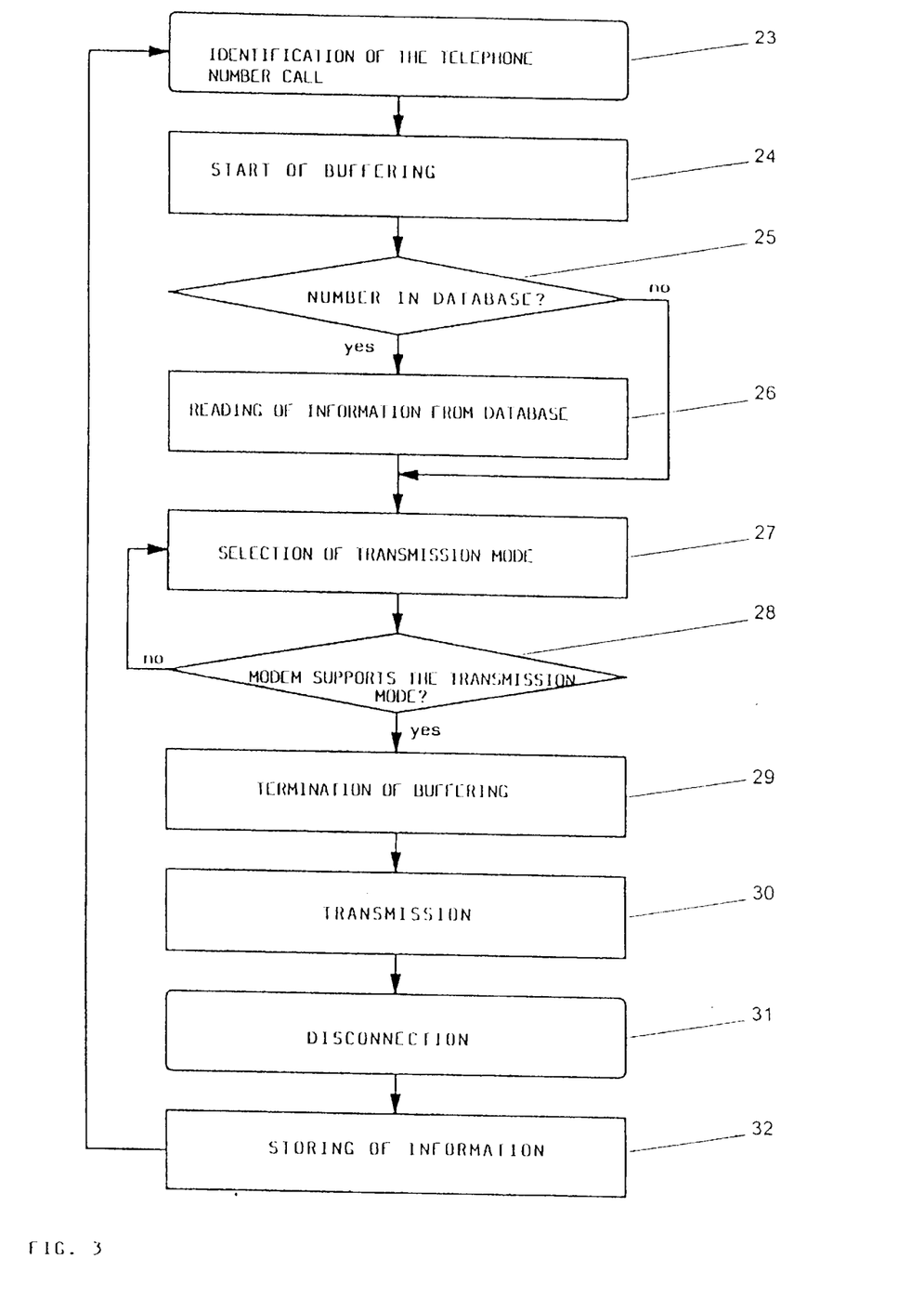
FIG. 3 is a flow diagram of the operation of a connection control block according to the invention.

In the first case, the connection establishment block 1 is controlled by the application software 2. Flow diagram of the operation is shown in FIG. 3.

At phase 23, the connection control block 4 waits for the telephone number s11 from the application software 2. The block 4 starts functioning when the connection call from the application software 2 with the connection address has been indicated. Information passed to the modem from the application software 2 will be buffered or blocked.

If the telephone number is not found in the database 6 at phase 25, the new number will be added to the database at phase 33 and the existing default parameters of the constant connection in the database will be copied to the store location of the new number. If there is no free space available in the database 6, the oldest or least used number will first be removed.

If the number exists in the database at phase 25, the history information corresponding to the number will be read from the database at phase 26.

At phase 27, an optimal connection protocol, i.e. transmission and handshaking methods, is chosen with the first algorithm on the basis of received history or default information. The algorithm may be used, for example, to reach such a connection protocol and data transfer rate which the history information indicates to be most used for this number. At phase 28 it is examined, whether the modem supports the chosen handshaking and connection protocols. If the modem does not support the choice, one returns to phase 27, and default data values will be used.

Buffering will be terminated at phase 29, and the transmission of buffered or blocked data from the application software 2 to the modem will be started at phase 30. After this, the modem will be connected to the radio part, and the connection will be established in a way known as such. After establishing the connection, the connection control will, in accordance with the invention, be transferred to the parameter block 5 described below. The connection parameters used during the connection are stored to the cache memory.

At phase 31, the control program 6 of the connection control block waits for the indication from the application software 2 for the connection to be over, and it will be disconnected.

At phase 32, both the connection address and the connection parameters will be stored from the cache memory to the database 6, after which the modem returns to the starting phase 23 to wait for a connection address call.

In the transparent method, the connection establishment block 1 supervises the traffic between the application software 2 and the modem operations control block 3 in a transparent way, i.e. the supervision is directed to a DTE-DCE interface. The control program is then able to complement the command lines of the AT selection so that the dialling procedure looks normal to the application software with the exception that numbers dialled from the internal memory of the modem with the ATDS command cannot be complemented. As in FIG. 3, the transparent method operates at phases, where It is defined that the modem answers the "AT<cr>" command with OK or 0 indication. If this does not happen, the program completes the command and waits for the correct confirmation.

Information passed to the modem from the application software 2 is buffered in a ring buffer and it is checked that the ATD command and telephone number are received.

The new number is added to the database, and default parameters are defined for the modem settings; if the number exists in the database, history information is used.

Connection protocol and data transfer rate are selected.

Buffering is terminated and data transfer started, when the selected parameters are stored to the cache memory.

When data transfer is completed, the connection is disconnected, and the number and connection parameters are passed from the cache memory to the database 6.

In connection establishment, also command interface s3 between blocks 1 and 3 is used in the transmission of AT commands. The block 1 also controls the power level of the radio unit 8 by signal s31.

During a connection the operation of the modem is supervised and controlled by the parameter block 5 (APRC, adaptive parameter renegotiation control).

Task of the parameter block is to change variables related with the data link in such a way that the connection meets the set requirements. For this purpose, both the history information saved in the database 6 and the estimate of the connection time or the length of the file to be transmitted supplied by the application software 2 are used.

The parameter block 5 maintains the optimal operation of the modem and defines the possibly needed measures with the help of fuzzy logic. Here it is assumed that the concept of fuzzy logic is known in itself, and its principles are not explained in more detail. Additional information on fuzzy logic and on modelling based on fuzzy sets and systems is available for example in the publications Earl Cox: "Fuzzy Fundamentals", IEEE Spectrum, October. 1992; Earl Cox: "Adaptive fuzzy systems, IEEE Spectrum, February. 1993; and Jyh-Shring R. Jang: "ANFIS: Adaptive-Network-Based Fuzzy Inference system", Department of Electrical Engineering and Computer Science, University of California, Berkeley, Calif. 94720.

The modification program operating in the parameter block 5 uses an adaptive algorithm. During a data transfer connection, the modification program is used for monitoring predetermined connection quality parameters, on the basis of which, according to the algorithm and with the help of history parameter information saved in the database, the selected connection parameters are charged for maintaining or disconnecting the data transfer connection. First, all variable premises are assigned a weight value defining the influence the premise can have in the processor logic. Second, the shape and duration of the input fuzzy sets are changed according to preset rules and statistical information received from the database block 6.

Figure 2:
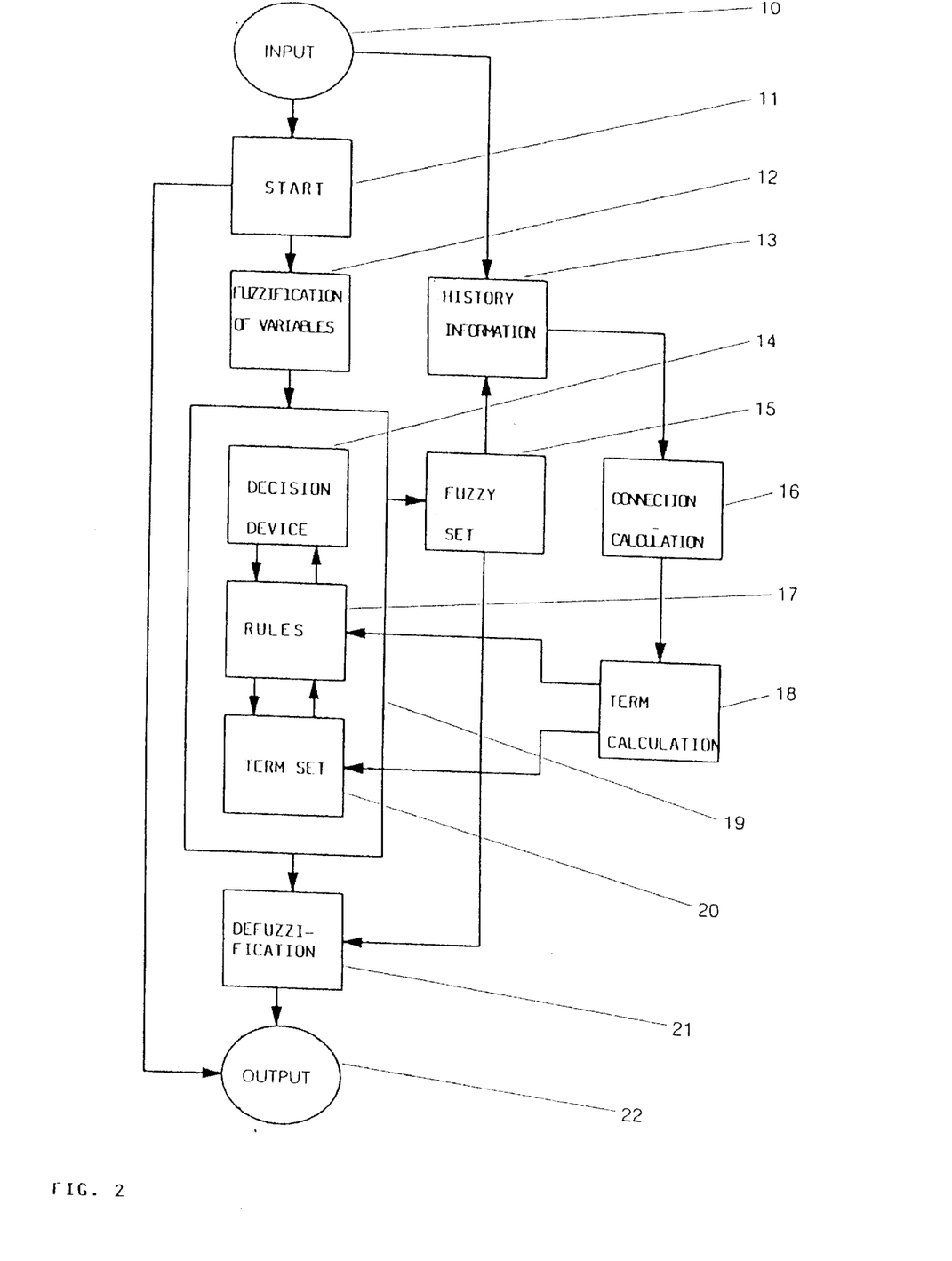
FIG. 2 is a block diagram of the operation of a parameter block within the method of the present invention when using fuzzy logic.

In connection with the parameter block 5 there is a starting block 7, the task of which is, on the basis of preset parameters, to discern the cases where the line quality is so good that the operation of the parameter block 5 based on fuzzy logic can be bypassed and it is possible to go directly to the passing of output data 22 (FIG. 2).

In FIG. 2, there is shown a block diagram of the parameter block operation of a modem in accordance with the present invention. The parameter block 5 of the modem in accordance with the invention comprises a starting block 11, a variable fuzzification block 12, a rule execution block 19, a term calculation block 18, a history information block 13 and a fuzzy set block 15 outcoming from the rule execution block 19, a connection calculation block 16, and a defuzzification block 21. The rule execution block includes a decision device block 14, a rule block 17, and a term set block 20. Input of the parameter block is marked with the number 10 and output with the number 22.

When the operation 10 of the parameter block 5 is started, first the starting block 11 checks, on the basis of preset parameters, such cases where the line quality is so good that the operation of the parameter block based on fuzzy logic can be bypassed. Finally it goes directly to the output 22 of the parameter block.

The following quantities are used as input parameters in decision making in the parameter block 5:

signal level received from the data pump block 9, square error, mean square error, peak square error;

from modem operation system parameters V.42, the number of faulty packets, the total number of packets, detection phase timer, acknowledgement timer, the maximum number of retransmissions, inactivity timer;

from negotiable system parameters of the modem operations, the number of octets in an information field, window size;

from modem software of the modem operations control block 3 and/or from connection protocol software, the current data transfer rate, the available data transfer rates, the relative usage of data transfer rates on the current data rate;

from the radio unit 8, strength of the received signal, battery state, current transmitter power level, radio link parameters; and from history information saved in the database 6 or from information saved in the decision algorithm of the parameter 5, the moving average of connection tine length, the moving average of effective connection time, tie achieved throughput on different data transfer rates, and the moving average of achieved throughput on different data transfer rates.

For example the following are used as output parameters in decision making in the parameter block 5:

to the V.32bis protocol software of the modem operations control block 3, the need to change the data transfer rate with the help of signals s2, s4 (i.e. the data transfer rate must be lowered or raised), information on disconnection, preferred initial data rate, and information "no changes";

to the error correcting V.42 protocol software of the modem operations block 3, change in the maximum number of octets in the information field of the signals s2, s4, change in window size, change in acknowledgement timer, change in the maximum number of retransmissions, change in inactivity timer; and to the radio unit 8, change in power level with the help of the signal s31.

From the parameter block 5 to the user interface (not shown), it is possible to control the modem operations with the known Hayes-AT commands and modem S-register-s. The user is given the means to have an influence e.g. on the following parameters:

activate the possibility to change the connection parameters;

activate dynamic control;

save the current data rate renegotiation profile;

restore the renegotiation profile set as factory defaults to the modem;

activate the dynamic adjustment of V.12 parameters;

set variables controlling the timing of connection changes;

set variables controlling the number of change attempts;

set threshold values which control the automatic bypass of the parameter block; and select the defuzzification method.

When the quality of connection is poor, the information on input variables is passed to the variable fuzzification block 12, which creates fuzzy sets to each variable. These fuzzy sets are passed to the rule execution block 19, which, with the help of the decision device block 14, the rule block 17 and the term set block 20, creates the outcoming fuzzy sets for each output alternative and passes them to the outcoming fuzzy set block 15.

In the defuzzification block 21, the outcoming fuzzy sets are defuzzified either on the basis of the maximum or moment of the output fuzzy set. The result of the method based on the composite maximum is dependent on the condition having the highest prediction value, and the method based on the moment tries to produce a result where the joint effect of all conditions is at the highest. When defuzzification has been executed, it is possible to go to the parameter block output 22.

The parameter block 5 of the modem ir accordance with the present invention operates adaptively so that history information is passed to the history information block 13, the connection calculation block 16 evaluating how to improve the performance of the block on the basis of this information. Correspondingly, the connection calculation block 16 passes the information on the improvements to the term calculation block 18, which correspondingly updates the rule block 17 and the term set block 20.

It is to be understood that the modem connection and error correcting rules can within the invention follow some other standard than V.32bis and V.42, but here it is presumed that the data transfer standard makes it possible to agree upon the rates and error correcting protocol whilst establishing the connection and to change the rate and other connection parameters during the connection.

The method and modem in accordance with the invention offer the user the possibility to control parameters related with the maintenance of an optimal connection; however, the program controls that the rules of the connection protocol are not violated. On the other hand, the system is fully transparent to ordinary users, and no modifications are needed before starting the connection.

Even with limited processor resources, the method of the invention is able to optimize the data transfer connection, because of the usage of history information. Thus it is not necessary to assemble all parameters and make real-time decisions, for which it seems very difficult to find an adequately good mathematical model and such an equipment construction where the model would function in real time.

Fuzzy logic requires some memory space, of which RAM memory known in itself can be used during the operation. In order to ensure the permanence of the database and fuzzy associative memory (FAM) as well as status weight and fuzzy set information, a nonvolatile memory has to be use. In this connection it should be noted that fuzzy logic is nowadays available from multiple hardware vendors, for example Americal NeuraLogic Inc. and Fujitsu.

Some applications of the method in accordance with the present invention are described above. Naturally, the principle of the invention can be modified within the scope of the claims, for example where functional details and range of usage are concerned. It should be mentioned that although the above description is concerned with the usage of the method in connection with a modem, the necessary functions can be in total applied to e.g. a mobile terminal, and when using direct digital data transfer, modulation/demodulation related with the modems are unnecessary.

With the method of the present invention it is possible to establish such a data link, which has the best possibilities to succeed in the light of statistical information. The solution in accordance with the invention can especially be applied to cellular networks and also to public telephone networks as well as new personal communications devices.

What is claimed is:

1. A method for controlling a data transfer connection on a transfer line with interference thereon, when said data is transferred from an application software (2) to a desired connection address, characterized in that:

historical connection parameter information respectively related to data transfer connections with desired connection addresses is stored in a database;

when establishing a data transfer connection over said transfer line to a chosen connection address from among said desired connection addresses, historical connection parameter information related with the chosen connection address is retrieved from said database; and on the basis of the retrieved historical connection parameter information and with the help of a predefined algorithm, connection parameters are selected which establish or maintain a data transfer connection at the chosen connection address that achieve an optimal data transfer connection over said transfer line.

2. A method according to claim 1, characterized in that during a data transfer connection, preset quality parameters in the historical connection parameter information are monitored.

3. A method according to claim 2, characterized in that on the basis of said preset quality parameters, in accordance with at least one of preset algorithm and with the help of historical connection parameter information stored in the database, changes are executed, when necessary, for maintaining an optimal data transfer connection or for disconnecting the connection.

4. A method according to claim 2, characterized in that said monitoring uses a modification program and the modification program includes a direct start algorithm, which bypasses said predefined algorithm when the preset quality parameters exist.

5. A method according to claim 1, characterized in that connection parameters; and related quality parameters, related with the chosen connection address and used during the connection, are stored to the database as historical connection parameter information.

6. A method according to claim 5, characterized in that the connection and related quality parameters producing as a whole an optimal data transfer result during the connection and related with the chosen connection address, are stored to the database by a control program when the data transfer connection is terminated.

7. A method according to claim 6, characterized in that, upon establishment of the connection, the control program retrieves from the application software at least one of the amount of information to be transferred and the estimated length of the connection.

8. A method according to claim 1, characterized in that, when establishing the connection, at least one piece of the following information is retrieved from the application software:
- the activation of redialling with normal settings after a failed connection establishment attempt;
- the allowed amount of redialling attempts; and
- the activation of the control program for only one connection establishment attempt.

9. A method according to claim 1, characterized in that the historical parameter connection information stored in the database includes at least one of the following:
- the cumulative number of connections to the chosen connection address;
- the cumulative number of connections realized to other connection addresses than the selected address;
- the connection protocol used last time to the chosen connection address and the achieved data transfer rate;
- the best data transfer rate achieved with the available connection protocols;
- the data transfer rate and connection protocol which have been used for most of the cumulative connection time; and
- statistical information on how much each data transfer rate of each connection protocol has been used of the cumulative connection time.

10. A method according to claim 1, characterized in that one or more of the following functional blocks are used:
- a modem operations control block (3),
- a connection establishment block (1), and
- a data pump block (9), which functional blocks (1, 3, 9) are linked to each other and to an external application software block (2) via data transfer buses (s1–s6, s21–s22, s11–s13), the connection establishment block (1) comprising one or more of the following internal functional blocks:
- a modem connection control block (4) with a control program;
- a parameter block (5) with a modification program and a related starting block (7) with a direct start algorithm being functional in the related starting block; and
- a database block (6) including said database, wherein said internal functional blocks of the connection establishment block (1) are linked to each other via data transfer buses.

11. A method according to claim 10, characterized in that the connection establishment block (1) is controlled by the application software (2) for operating with a modem in such a way that:
- the operation of the modem connection control block (4) starts when the call from the application software (2) with the connection address (s11) is indicated (23),
- data passed from the application software (2) to the modem is buffered or blocked (24),
- if the connection address does not exist in the database (25), this new connection address is added to the database, from which default parameters are read for modem settings; but if the connection address exists in the database (25), the corresponding historical connection parameter information is read from the database (26) to the dialling phase (27), and at the connection protocol selection phase (27), the optimal connection protocol is selected using the predefined algorithm,
- if the modem does not support the chosen connection protocol (28), a new connection protocol is selected (27),
- buffering is terminated (29),
- transmission of buffered or blocked data from the application software is started (30), and connection parameters are stored to a cache memory,
- the information from the application software (2) on the termination of data transfer is awaited and the connection is terminated (31), and
- the connection address and connection parameters are stored (32) from the cache memory to the database (6), after which phase the modem returns to wait for a connection address call (23).

12. A method according to claim 10, characterized in that the connection establishment block (1) supervises the traffic between the application software (2) and the modem operations control block (3) in a transparent way so that:
- it is defined that the modem operations control block (3) answers with a preset connection call acknowledgement;
- data passed from the application software (2) to the modem is buffered in a ring buffer, and the connection address in indicated;
- if the connection address does not exist in the database, this new connection address is added to the database and default parameters are read from the database for modem settings;
- if the connection address exists in the database, the corresponding historical connection parameter information is read from the database to the selection phase, and in the connection protocol selection phase, an optimal connection protocol is selected using the predefined algorithm;
- buffering is terminated, and transmission of buffered data from the database is started, and connection parameters are stored to a cache memory;
- the information from the modem operations control block (3) is waited for on the termination of the data transfer, when the connection is disconnected; and the connection parameters are stored from the cache memory to the database (6), after which the modem returns to wait for a connection address call.

13. A method according to claim 10, characterized in that the connection protocol V.32bis and/or V.42 are applicable in the modem operations control block (3).

14. A method according to claim 10, characterized in that an algorithm based on fuzzy logic is used in the parameter block (5).

15. A method according to claim 14, characterized in that the predefined algorithm in the parameter block is an algorithm of fuzzy logic which comprises the following phases:

input data (10) is assembled;

on the basis of preset parameters, cases are indicated at the starting phase (11) wherein the line quality is so good that the operation of the parameter block (5) based on fuzzy logic can be bypassed and the output data (22) is directly passed;

and in other cases:

fuzzy sets are created for each input variable upon fuzzification of variables (12), fuzzy sets for output parameters are created at a rule execution phase (19) with the help of a decision device (14), rules (17) and a term set (20);

fuzzification of output parameters is defuzzified at a defuzzification phase (21) and output data is passed (22) to the modem control block (3), wherein:

the parameter block (5) operates adaptively in such a way that input data from the input data assembly phase (10) and new connection data created at a rule execution phase (19) are passed to historical parameter connection information (13), on the basis of which a connection calculation phase (16) creates more optimal parameters for the modem and passes them to term calculation (18), the term calculation (18) updating the new data for the rules (17) and term set (20).

16. A method according to claim 10, characterized in that an algorithm based on a neural network is used in the parameter block (5).

17. A method according to claim 10, characterized in that a dynamic adaptive algorithm is used in the parameter block (5) to modify the parameter variables.

18. A method according to claim 10, characterized in that at least one of the following is used as an input parameter for decision making in the parameter block (5):

from the data pump block (9), the level of the received signal, square error, mean square error, and peak square error;

from the system parameters of the modem operations, the number of faulty packets, the total number of packets, the detection phase time, the acknowledgment time, the maximum number of retransmissions, and the inactivity time;

from the negotiable system parameters of the modem operations, the number of octets in the information field, and the window size;

from at least one of the modem program of the modem operations control block (3) and from the connection protocol program, the current data rate, the available data rates, and the relative usage of data rates at the current data rate, and from the historical parameter connection information saved in the database (6) or from the information saved in a decision algorithm of the parameter block (5), the moving average of the effective connection time, the achieved throughput on a different data rates, and the moving average of the achieved data throughput on different data rates.

19. A method according to claim 10, wherein said parameter block (5) contains a decision algorithm and characterized in that a weight value is assigned to the input parameters of the parameter block (5) defining the effect of the parameter on the decision algorithm logic.

20. A method according to claim 10, characterized in that at least one of the following is used as an output parameter for decision making in the parameter block (5):

to the connection protocol program of the modem operations control block (3), the need to modify the data transfer rate, a disconnection indication, and the initial data transfer rate considered advantageous, and to the error correcting program of the modem operations control block (3), a change in the maximum number of octets in the data field, a change in window size, a change in detection phase time, a change in the maximum number of retransmissions, and a change in the inactivity time.

21. A method according to claim 10, characterized in that the method is applied to a mobile station having a radio unit (8), the connection establishment block (1) being additionally linked to the radio unit (8) of the mobile station via a data transfer bus (s31–s34).

22. A method according to claim 21, characterized in that at least one of the following is used as an input parameter for decision making in the parameter block (5):

the strength of the signal received from the radio unit (8), the battery state, and the current transmission power and radio connection parameters.

23. A method according to claim 21, characterized in that the transmission power of the radio unit (8) of the change in it is used as an output parameter for decision making in the parameter block (5).

24. An equipment for controlling a data transfer connection, characterized in that said equipment comprises:

means for saving historical connection parameters associated with connection addresses with which a data transfer connection has been made; and means for selecting the connection parameters from the saved historical connection parameters when at least one of establishing a subsequent data transfer connection and during a connection with the help of the information and a preset algorithm to a chosen connection address, for obtaining an optimal data transfer connection to the chosen connection address.

25. An equipment according to claim 24, characterized in that said equipment comprises means for measuring the connection quality and for saving the measurement results related to the connection parameters to be formed as said historical connection parameters.

26. An equipment according to claim 24, characterized in that said equipment comprises:

a modem, with means for controlling modem operations (3), means for connection establishment (1), and means for data pumping (9), and wherein said means (1, 3, 9) are linked to each other and to an external application software block (2) via data transfer buses (s1–s6, s21–s22, s11–s13).

27. An equipment according to claim 26, characterized in that the said modem is connected to a mobile station.

28. An equipment according to claim 26, characterized in that said means for connection establishment (1) comprises:

a connection control block (4) with a control program;

a parameter block (5) with a modification program, and with a related starting block including a direct start algorithm; and a database block (6) including said database, and wherein said blocks of the means for connection establishment (1) are linked to each other via data transfer buses.

29. An equipment according to claim 24, characterized in that said equipment comprises:

a digital mobile station, with
means for controlling modem operations block (3), and
means for connection establishment (1),
and wherein said means (1, 3, 9) are linked to each other and to an external application software block via data transfer buses (s1–s6, s11–s13).

* * * * *

UNITED STATES PATENT AND TRADEMARK OFFICE
CERTIFICATE OF CORRECTION

PATENT NO. : 6,067,534
DATED : May 23, 2000
INVENTOR(S) : Mikko Terho and Petri Nykanen It is certified that error appears in the above-identified patent and that said Letters Patent is hereby corrected as shown below:

<u>Title page,</u>
Item [22], should read -- Filed: Dec., 14, 1995 --.
Insert Item:
-- [30] Foreign Application Priority Data
Finnish Patent Application 946063 Filed 23 December 1994. --.

Signed and Sealed this

Twenty-ninth Day of November, 2005

JON W. DUDAS
*Director of the United States Patent and Trademark Office*